United States Patent
Ito et al.

(10) Patent No.: US 11,729,017 B2
(45) Date of Patent: Aug. 15, 2023

(54) LOAD DRIVE SYSTEM

(71) Applicant: DENSO CORPORATION, Kariya (JP)

(72) Inventors: Akito Ito, Kariya (JP); Yusuke Takahashi, Kariya (JP); Kotaro Tanaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 122 days.

(21) Appl. No.: 17/403,708

(22) Filed: Aug. 16, 2021

(65) Prior Publication Data
US 2022/0060352 A1 Feb. 24, 2022

(30) Foreign Application Priority Data

Aug. 18, 2020 (JP) ................. 2020-138192

(51) Int. Cl.
*H04L 12/40* (2006.01)
*G06F 9/4401* (2018.01)
*G06F 9/54* (2006.01)

(52) U.S. Cl.
CPC ............ *H04L 12/40* (2013.01); *G06F 9/4411* (2013.01); *G06F 9/546* (2013.01); *H04L 2012/40215* (2013.01); *H04L 2012/40273* (2013.01)

(58) Field of Classification Search
CPC ........... H04L 12/40; H04L 2012/40215; H04L 2012/40273; H04L 12/40013; H04L 12/40006; H04L 1/0023; H04L 5/0053; G06F 9/4411; G06F 9/546
See application file for complete search history.

(56) References Cited

U.S. PATENT DOCUMENTS 9,575,525 B2 * 2/2017 Asano ............... H04L 12/40039
2016/0359434 A1 12/2016 Numata et al.

FOREIGN PATENT DOCUMENTS

JP 2013-024080 A 2/2013

* cited by examiner

*Primary Examiner* — El Hadji M Sall
(74) *Attorney, Agent, or Firm* — Posz Law Group, PLC

(57) ABSTRACT

A load drive system includes a communication bus; a controller; and a driver. The controller has a CAN transceiver and a CAN controller that transmit an instruction message instructing a drive state of a solenoid of an automatic transmission via the communication bus. The driver has (i) a CAN transceiver and a CAN controller that receive the instruction message via the communication bus, and (ii) a drive circuit that drives the solenoid according to the received instruction message. The controller transmits a first periodic message in a first cycle and a second periodic message in a second cycle, respectively as the instruction message.

12 Claims, 7 Drawing Sheets

LOAD DRIVE SYSTEM

CROSS REFERENCE TO RELATED APPLICATION

The present application is based on and claims the benefit of priority of Japanese Patent Application No. 2020-138192, filed on Aug. 18, 2020, the disclosure of which is incorporated herein by reference.

TECHNICAL FIELD

The present disclosure generally relates to a load drive system.

BACKGROUND INFORMATION

A load drive system includes a controller and a driver. The driver includes (i) a decoder into which a load drive instruction for driving a load is input from the controller, and (ii) a drive circuit that drives the load according to a signal converted by the decoder. In such a configuration, a drive instruction is transmitted from the controller at regular intervals/cycle. Therefore, in such a configuration, if a plurality of, or many, drive instructions are going to be transmitted, the amount of communication may increase. Further improvements are required in the load drive system in the above-mentioned viewpoint or in other viewpoints not mentioned.

SUMMARY

It is an object of the present disclosure to provide a load drive system capable of reducing traffic and/or amount of communication.

BRIEF DESCRIPTION OF DRAWINGS

Objects, features, and advantages of the present disclosure will become more apparent from the following detailed description made with reference to the accompanying drawings, in which.

DETAILED DESCRIPTION

Figure 1:
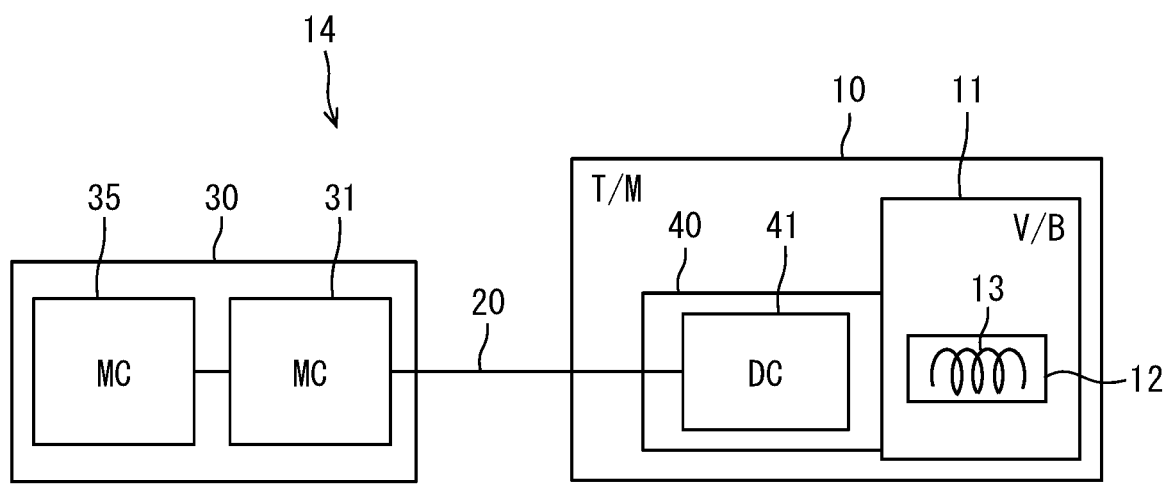
FIG. 1 is a schematic configuration of an automatic transmission to which a load drive system according to a first embodiment is applied.

Hereinafter, a plurality of embodiments are described with reference to the drawings. It is noted that the same reference numerals are attached to the corresponding constituent elements in each of the embodiments, and redundant explanation may be omitted. In each of the embodiments, when only a part of the configuration is described, the other parts of the configuration may be borrowed from the other embodiments. Further, not only the combinations of the configurations explicitly shown in the description of the respective embodiments, but also the combinations of the configurations of the multiple embodiments not explicitly described can also be combinable to serve as the present disclosure, as long as there is no difficulty in such combinations in particular.

First Embodiment

The load drive system according to the present embodiment can be applied to, for example, a load mounted on a vehicle. In the following, an example applied to an automatic transmission of a vehicle is described.

<Automatic Transmission>

First, a schematic configuration of an automatic transmission is described with reference to FIG. 1. FIG. 1 shows an automatic transmission to which the load drive system according to the present embodiment is applied. In FIG. 1, the automatic transmission is shown as T/M and a valve body is shown as V/B.

As shown in FIG. 1, an automatic transmission 10 includes a valve body 11, a transmission mechanism (not shown), an oil pump, a parking lock mechanism, and the like. The transmission mechanism has a plurality of friction elements including, for example, a clutch, a brake and the like. The transmission mechanism can change a gear ratio step by step by selectively engaging the friction elements.

A hydraulic circuit for adjusting the pressure of hydraulic oil supplied to the transmission mechanism is provided in the valve body 11. The valve body 11 has a plurality of solenoid valves 12 that regulate the hydraulic oil pumped from an oil pump and supply the oil to the friction elements. In FIG. 1, for convenience, only one solenoid valve 12 is shown. The solenoid valve 12 has a solenoid 13. The solenoid 13 may sometimes be referred to as a coil. The hydraulic oil is pressure-adjusted by controlling energization of (i.e., supply of electric current to) the solenoid 13.

<Load Drive System>

Figure 2:
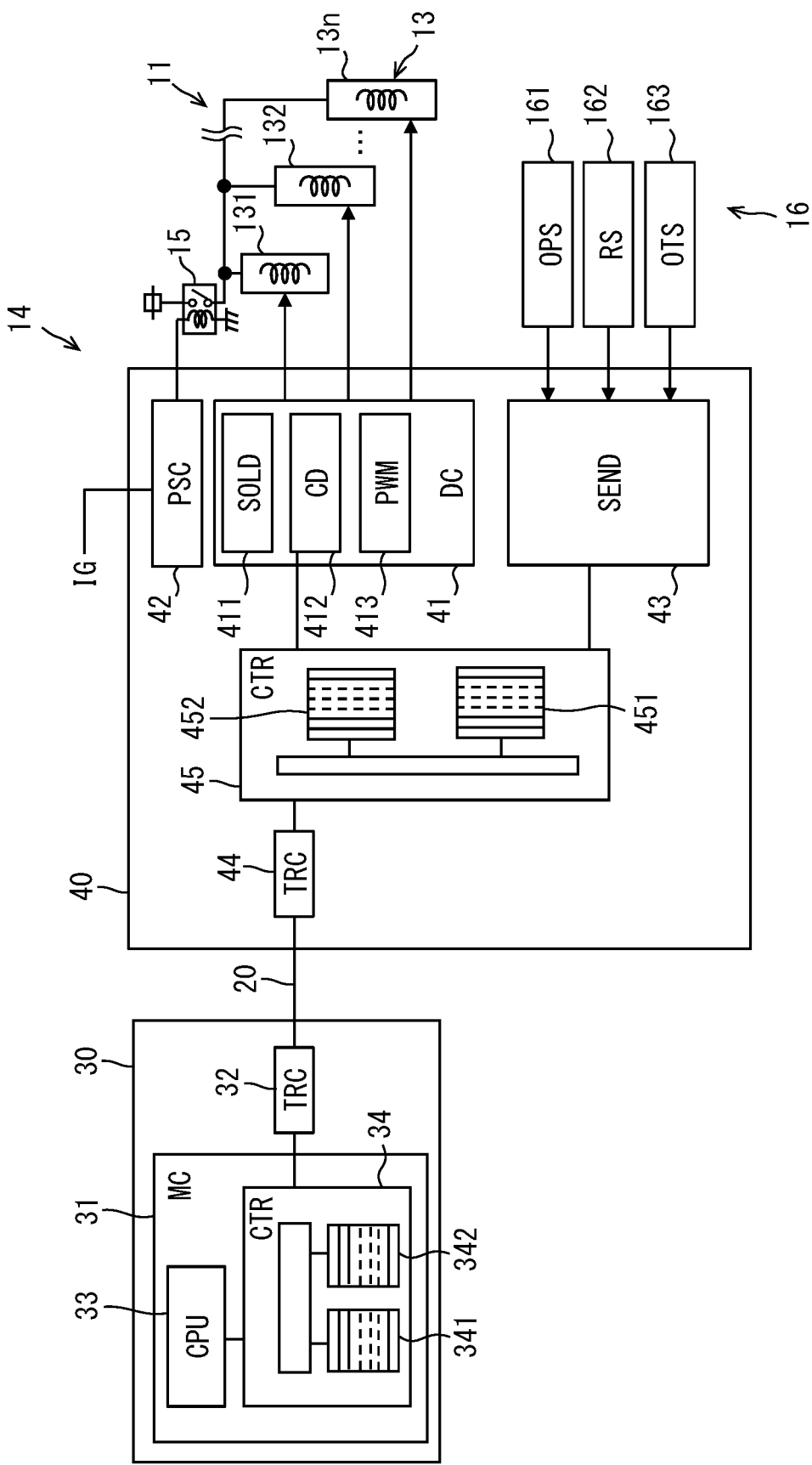
FIG. 2 is a diagram of the load drive system.
Figure 3:
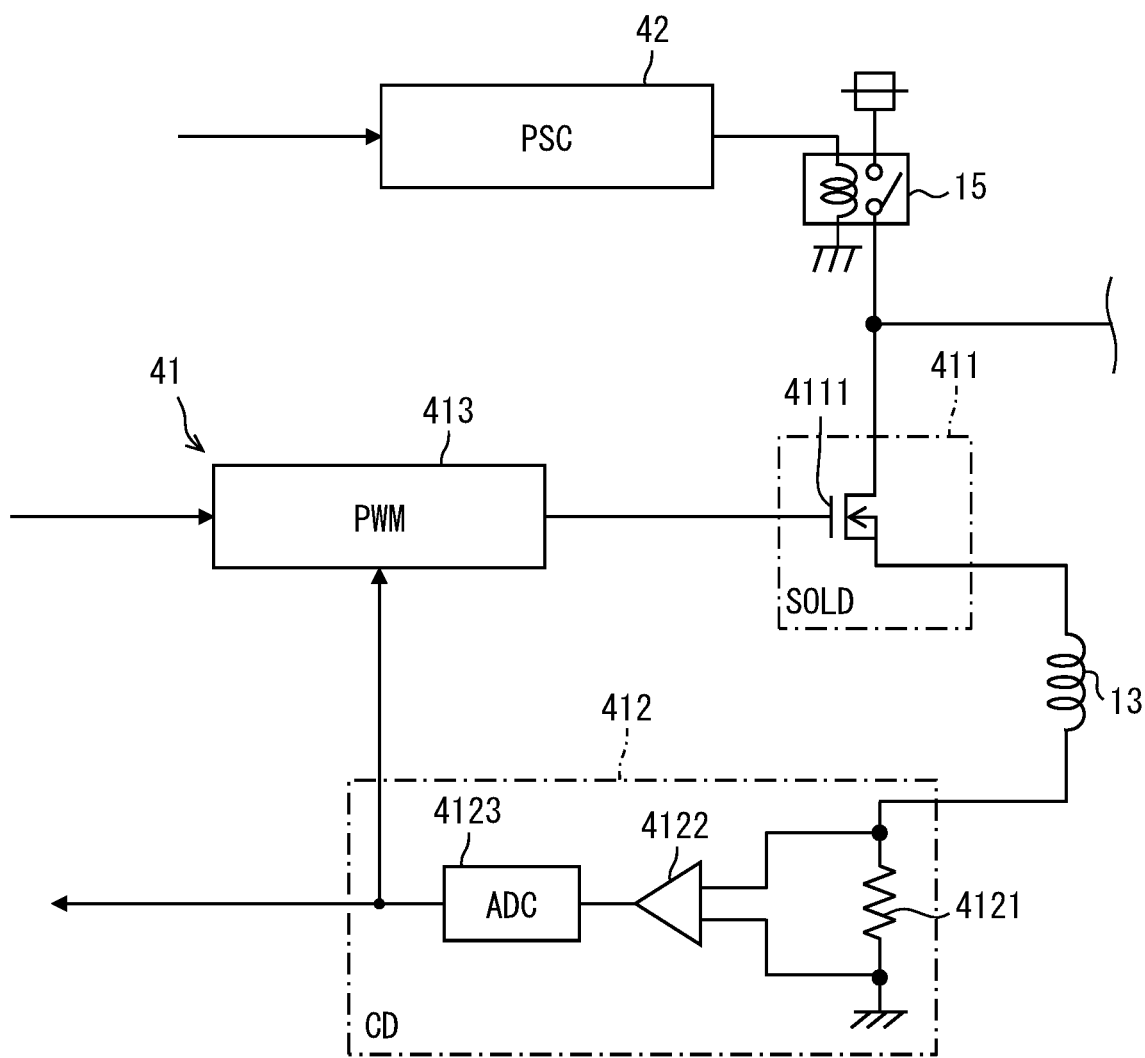
FIG. 3 is a diagram of a schematic configuration of a drive circuit.

Next, a schematic configuration of the load drive system is described with reference to FIGS. 1, 2, and 3. FIG. 2 is a diagram showing a load drive system. In FIG. 2, for convenience, the illustration of a monitoring microcontroller is omitted. In addition, the energization path of the solenoid 13 is simplified. FIG. 2 shows an example in which the valve body 11 has n pieces (n≥3) of solenoids 13 including solenoids 131 to 13n. FIG. 3 is a diagram showing a drive circuit of a driver. In FIG. 3, for convenience, only one solenoid drive circuit and one current detection circuit corresponding to one solenoid 13 are shown from among the solenoid drive circuits and the current detection circuits.

In FIGS. 1 and 2, the microcontroller is shown as MC and the drive circuit is shown as DC. In FIGS. 2 and 3, a PWM output circuit is shown as PWM, a solenoid drive circuit is shown as SOLD, a current detection circuit is shown as CD, and a breaker circuit is shown as PSC (Prospective Short-circuit Current breaker). In FIG. 2, a CAN controller is shown as CTR, and a CAN transceiver is shown as TRC. Further, a sensor detection circuit is shown as SEND, an oil pressure sensor is shown as OPS, a rotation sensor is shown as RS, and an oil temperature sensor is shown as OTS. In FIG. 3, the A/D converter is referred to as an ADC.

As shown in FIGS. 1 and 2, a load drive system 14 includes at least a communication bus 20, a controller 30, and a driver 40. The load drive system 14 controls the drive of the load. The load to be controlled is the automatic transmission 10 including the solenoid 13 and the valve body 11. In the load drive system 14, the driver 40 is arranged on the valve body 11. That is, the driver 40 has a mechatronics integrated structure with the automatic transmission 10. The controller 30 is mechanically/physically separated from the automatic transmission 10.

The controller 30 and the driver 40 are connected to a common communication bus 20. A device (not shown) other than the controller 30 and the driver 40 may also be connected to the communication bus 20. In the present embodiment, the controller 30 and the driver 40 are configured to be able to communicate with each other via the communication bus 20 of a vehicle-mounted network conforming to a CAN protocol. The communication bus may also be referred to as a CAN bus. CAN is an abbreviation for Controller Area Network. CAN is a registered trademark.

In the load drive system 14 of the present embodiment, messages transmitted by the controller 30 and the driver 40 are prioritized in advance according to the importance and type of the messages. Thus, whenever transmitting messages, priority information (ID code) indicating the priority of a message to be transmitted is transmitted first, i.e., prior to the message transmission. At such timing, when the transmission of the priority information of a plurality of messages conflicts/collides, the priority information of each of the messages is arbitrated, and the priority information having a higher priority acquires a transmission right.

The controller 30 includes a microcontroller 31 and a CAN transceiver 32. The microcontroller 31 is a controller/computer provided with a CPU 33, a CAN controller 34, a ROM (not shown), a RAM, a register, and the like. In the microcontroller 31, the CPU 33 executes various controls according to a control program stored in advance in the ROM while using a temporary storage function of the RAM or the register. The CPU 33 executes control using data acquired from outside the controller 30, for example, a detection signal of a sensor. The CPU 33 of the present embodiment controls the solenoid 13, and thus ultimately the automatic transmission 10.

The CPU 33 of the microcontroller 31 performs a predetermined calculation to set a target current value. The target current value is a current value to be passed through the solenoid 13 in order to bring the solenoid 13 into a target state. The microcontroller 31 acquires a state of the automatic transmission 10, and calculates a target oil pressure which is a required value of the output oil pressure of the solenoid 13. The microcontroller 31 calculates the target oil pressure based on, for example, a rotation speed on an input side and a rotation speed on an output side of the automatic transmission 10. The microcontroller 31 sets the target current value based on the calculated target oil pressure. The relationship between the target oil pressure and the target current value is predetermined as, for example, a map or a function. The controller 30 instructs the driver 40 of the target current value.

The CPU 33 of the microcontroller 31 sets a duty ratio based on the state of the automatic transmission 10. The microcontroller 31 sets the duty ratio in order to suppress current fluctuations such as overshoot and current ripple at an initial stage of shifting. The duty ratio is a duty ratio of a PWM signal output to a gate of a drive switch 4111, which is described later. The microcontroller 31 sets the duty ratio based on, for example, at least one of a pressure of the hydraulic oil in the hydraulic circuit, temperature of the hydraulic oil, and the actual current value flowing through the solenoid 13. The controller 30 instructs the driver 40 of the duty ratio. The controller 30 may instruct the duty ratio during (i.e., all through) a power on period when the power of the controller 30 is turned ON, or may instruct the duty ratio only during a temporary period such as the initial stage of shifting.

The CPU 33 of the microcontroller 31 determines whether or not an abnormality has occurred based on the state of the automatic transmission 10. The microcontroller 31 compares, for example, the pressure of the hydraulic oil with an oil pressure threshold value, and determines whether or not an abnormality has occurred. The microcontroller 31 compares, for example, temperature of the hydraulic oil with a temperature threshold value, and determines whether or not an abnormality has occurred. When it is determined that an abnormality has occurred, the controller 30 outputs an emergency instruction to the driver 40 in order to bring all the solenoids 13 into a predetermined abnormality treatment/handling state. As an emergency instruction, the controller 30 of the present embodiment outputs an emergency shutoff instruction to the driver 40 in order to shut off the energization of all the solenoids 13.

The microcontroller 31 has a built-in CAN controller 34 for transmitting and receiving messages via the communication bus 20. The CAN controller 34 executes communication control according to the CAN protocol. The CAN controller 34 executes, for example, transmission control, reception control, and arbitration control.

The CAN transceiver 32 is electrically connected to the CAN controller 34 and is also electrically connected to the communication bus 20. The CAN transceiver 32 makes it possible to transmit a communication message in both directions between the communication bus 20 and the CAN controller 34 by mutually/bi-directionally converting electrical characteristics between the communication bus 20 and the CAN controller 34. For example, by converting a bus level signal of the communication bus 20 into a digital signal that can be handled by the CAN controller 34, a dominant and a recessive can be recognized. That is, the CAN controller 34 is enabled to transmit and receive communication messages to and from the communication bus 20 by connection to the communication bus 20 via the CAN transceiver 32.

The CAN controller 34 has a message box for storing messages. The CAN controller 34 has a message box 341 for transmission (i.e., TRN MB in the drawing: may also be referred to as "transmission message box") and a message box 342 for reception (i.e., may also be referred to as "reception message box"). The CAN controller 34 sequentially stores messages for transmission acquired via a communication interface in the message box 341. The CAN controller 34 performs a transmission process for the stored message according to the priority of the ID code thereof. The CAN controller 34 generates a frame based on the message stored in the message box 341, and transmits the frame to the communication bus 20 via the CAN transceiver 32. In the present embodiment, at least one of the frames for transmitting a message includes instructions to the plurality of solenoids 13 in a 64-bit data field.

The CAN controller 34 receives a frame from the communication bus 20 via the CAN transceiver 32, extracts a message or the like, and sequentially stores the message or the like in the message box 342. The CAN controller 34 outputs the received message to a transmission target (i.e., a destination) according to the priority of the ID code. The CAN controller 34 arbitrates the transmission right (i.e., bit-unit non-destructive arbitration) when frames collide on the communication bus 20.

The CAN controller 34 also detects and notifies errors that occur in connection with the transmission and reception of frames. The CAN transceiver 32 and the CAN controller 34 correspond to a controller side communication unit.

Figure 5:
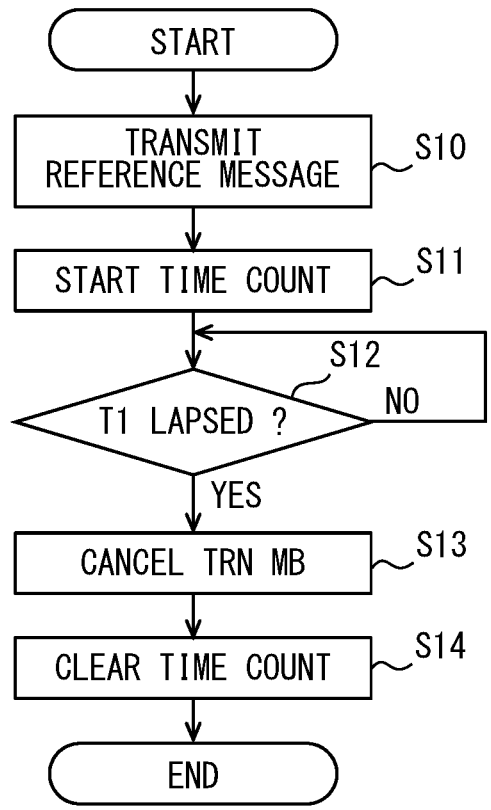
FIG. 5 is a flowchart of a transmission process of a reference message performed by a controller.

The controller 30 may further include a microcontroller 35 as shown in FIG. 5. The microcontroller 35 monitors whether the microcontroller 31 is operating normally/appropriately. The microcontroller 31 may also be referred to as a main microcontroller, and the microcontroller 35 may also be referred to as a monitoring microcontroller. The microcontroller 35 monitors, for example, whether the microcontroller 31 has a watch dog abnormality, a communication abnormality, or an abnormality of a calculation function. In addition to the monitoring function described above, the microcontroller 35 may have a function of assisting a control performed by the microcontroller 31. The microcontroller 35 may perform a control different from that of the load drive system 14. The microcontroller 35 may also have a built-in CAN controller (not shown) so that messages can be transmitted and received via the communication bus 20.

In the present embodiment, a monitoring means of the microcontroller 31 is configured/provided as the microcontroller 35, and the microcontrollers 31 and 35 mutually monitor whether or not they are operating normally/appropriately. The monitoring means of the microcontroller 31 is not limited to the microcontroller 35. A monitoring IC may be provided instead of the microcontroller 35. The controller 30 may be configured not to include a monitoring means such as the microcontroller 35.

The driver 40 does not include a microcontroller. The driver 40 includes a drive circuit 41, a breaker circuit 42, a sensor detection circuit 43, a CAN transceiver 44, and a CAN controller 45. The drive circuit 41 drives the solenoid 13 according to an instruction from the controller 30. As shown in FIGS. 2 and 3, the drive circuit 41 includes a solenoid drive circuit 411, a current detection circuit 412, and a PWM output circuit 413. PWM is an abbreviation for Pulse Width Modulation.

As shown in FIG. 3, the solenoid drive circuit 411 has a drive switch 4111 connected in series with the corresponding solenoid 13. The drive switch 4111 is provided one-to-one with respect to the solenoid 13. The drive switch 4111 is provided on the energization path of the corresponding solenoid 13. The drive switch 4111 repeatedly turns ON and OFF according to a PWM signal output from the PWM output circuit 413, and connects or disconnects the solenoid 13 and a power supply. The solenoid drive circuit 411 has a plurality of drive switches 4111 in order to control energization of the plurality of solenoids 13. The solenoid drive circuit 411 corresponds to each of a plurality of drive units that respectively drive the load.

The drive switch 4111 may be provided either on a power supply side or on a ground (GND) side with respect to the corresponding solenoid 13. The power supply side may also be referred to as a high side (i.e., an upstream side). The ground side may also be referred to as a low side (i.e., a downstream side). The drive switch 4111 of the present embodiment is provided on the power supply side with respect to the solenoid 13. In the present embodiment, a MOSFET is used as the drive switch 4111.

The current detection circuit 412 detects an electric current flowing through the solenoid 13, that is, detects an actual current. The current detection circuit 412 includes a resistor 4121, an operational amplifier 4122, and an A/D converter 4123. The current detection circuit 412 is provided one-to-one for the solenoid 13.

The resistor 4121 is connected in series with the corresponding solenoid 13. The resistor 4121 of the present embodiment is provided on the ground side with respect to the solenoid 13. One of two ends of the resistor 4121 is connected to a downstream terminal of the solenoid 13, and the other end thereof is grounded. In such manner, the resistor 4121 is so provided that a voltage generated between both ends of the resistor 4121 becomes a voltage corresponding to the electric current (i.e., an actual current value) flowing through the solenoid 13.

The operational amplifier 4122 amplifies and outputs the voltage applied to both ends of the resistor 4121. A positive electrode input terminal of the operational amplifier 4122 is connected to a terminal on the upstream side of the resistor 4121. A negative electrode input terminal of the operational amplifier 4122 is connected to a terminal on the downstream side of the resistor 4121.

The A/D converter 4123 A/D converts the output of the operational amplifier 4122, that is, the actual current value, and outputs the converted value. An input terminal of the A/D converter 4123 is connected to an output terminal of the operational amplifier 4122.

The PWM output circuit 413 generates a PWM signal according to an instruction from the controller 30, and outputs the PWM signal to the gate of the drive switch 4111. The PWM output circuit 413 generates PWM signals for a plurality of drive switches 4111 according to a single (i.e., one) instruction message transmitted from the controller 30. The PWM output circuit 413 includes (i) a feedback control circuit that performs a feedback control so that the actual current value detected by the current detection circuit 412 follows the target current value acquired from the controller 30 via the communication bus 20, and (ii) a duty ratio setting circuit that sets a duty ratio.

The feedback control circuit includes (i) a circuit that calculates a deviation (i.e., a current deviation) between the target current value and the actual current value, and (ii) a duty ratio calculation circuit that calculates the duty ratio. The duty ratio calculation circuit is, for example, configured to perform a PID control. For performing a PID control, the duty ratio calculation circuit includes (a) a circuit calculating the duty ratio in proportion to the deviation, (b) a circuit calculating the duty ratio in proportion to an integral value of the deviation, a circuit calculating the duty ratio in proportion to a differential value of the deviation, and a circuit calculating a sum of the duty ratios.

The duty ratio setting circuit sets the duty ratio of the PWM signal. The duty ratio setting circuit includes, for example, a register. The duty ratio calculation circuit sets the calculated duty ratio in the register. When the PWM output circuit 413 acquires a duty ratio instruction from the controller 30 via the communication bus 20, the acquired duty ratio is set in the register. The duty ratio setting circuit generates a PWM signal of the duty ratio set in the register at a predetermined drive frequency, and outputs it to the gate of the drive switch 4111.

The breaker circuit 42 controls the ON/OFF of a power supply switch 15. As shown in FIGS. 2 and 3, the power supply switch 15 is provided in the energization path of the solenoid 13. A single (common) power supply switch 15 is provided for the plurality of solenoids 13. The power supply switch 15 controls energization of all solenoids 13. By turning ON the power supply switch 15, an electric current can be supplied to each of the plurality of solenoids 13.

When the power supply switch 15 is turned OFF, the supply of electric current to each of the plurality of solenoids 13 is interrupted.

The power supply switch 15 may be provided either on the power supply side or on the ground side with respect to the solenoid 13. The power supply switch 15 of the present embodiment is arranged on the power supply side of the solenoid 13. The power supply switch 15 is provided on the power supply side (i.e., on an upstream side) of the connection point of the plurality of solenoids 13.

The breaker circuit 42 drives the power supply switch 15 according to an IG (ignition) signal. When an IG switch of the vehicle is turned ON and an IG ON signal is input, the breaker circuit 42 turns ON the power supply switch 15. When the IG switch is turned OFF and an IG OFF signal is input, the breaker circuit 42 turns OFF the power supply switch 15. The breaker circuit 42 of the present embodiment turns OFF the power supply switch 15 when an emergency instruction is input from the controller 30 during a period in which the IG ON signal is input.

The sensor detection circuit 43 detects a signal of the sensor 16. The sensor detection circuit 43 performs predetermined processing, such as waveform detection, A/D conversion, and the like on the input signal from the sensor 16. The sensor 16 detects a state of the load, that is, a state of the automatic transmission 10 including the valve body 11. The sensor 16 of the present embodiment includes a hydraulic sensor 161, a rotation sensor 162, and an oil temperature sensor 163. The hydraulic sensor 161 detects a pressure of the hydraulic oil in the hydraulic circuit. The rotation sensor 162 detects a rotation speed (i.e., a number of rotations per unit time) of the automatic transmission 10. The rotation sensor 162 includes, for example, (i) a sensor that detects the rotation speed on an input side of the automatic transmission 10 and (ii) a sensor that detects the rotation speed on an output side thereof. The oil temperature sensor 163 detects temperature of the hydraulic oil in the hydraulic circuit.

The CAN transceiver 44 is electrically connected to the CAN controller 45, and is also electrically connected to the communication bus 20. The CAN transceiver 44 enables bi-directional transmission of a communication message between the communication bus 20 and the CAN controller 45 by mutually/bi-directionally converting the electrical characteristics between the communication bus 20 and the CAN controller 45. The CAN controller 45, having connection to the communication bus 20 via the CAN transceiver 44, is capable of transmitting and receiving communication messages to and from the communication bus 20.

The CAN controller 45 has a message box for storing a message. The CAN controller 45 has a message box 451 for transmission (i.e., TRN MB in the drawing) and a message box 452 for reception. The CAN controller 45 sequentially stores, in the message box 451, the messages for transmission acquired via the communication interface. The CAN controller 45 performs a transmission process of the stored message according to a priority of the ID code. The CAN controller 45 generates a frame based on the message stored in the message box 451, and transmits the frame to the communication bus 20 via the CAN transceiver 44.

The CAN controller 45 receives a frame from the communication bus 20 via the CAN transceiver 44, extracts a message or the like, and sequentially stores the message or the like in the message box 452. The CAN controller 45 outputs the received message to the transmission target according to the priority of the ID code. The CAN controller 45 arbitrates the transmission right when the frames collide on the communication bus 20. The CAN controller 45 also detects and notifies errors that occur in connection with the transmission and reception of the frames. The CAN transceiver 44 and the CAN controller 45 correspond to a driver-side communication unit.

The driver 40 is so configured that communication, e.g., SPI communication, is enabled between/among the CAN controller 45 and the drive circuit 41, the breaker circuit 42, and the sensor detection circuit 43, for example. SPI is an abbreviation for Serial Peripheral Interface.

The load drive system 14 may further include at least one of the power supply switch 15 and the sensor 16 described above. For example, the load drive system 14 may include both of a power supply switch 15 and a sensor 16. The load drive system 14 may also be so configured that the power supply switch 15 and the sensor 16 are dispensed therefrom, and thus the power supply switch 15 and the sensor 16 may be arranged outside the load drive system 14.

<Operation of Load Drive System>

Figure 4:
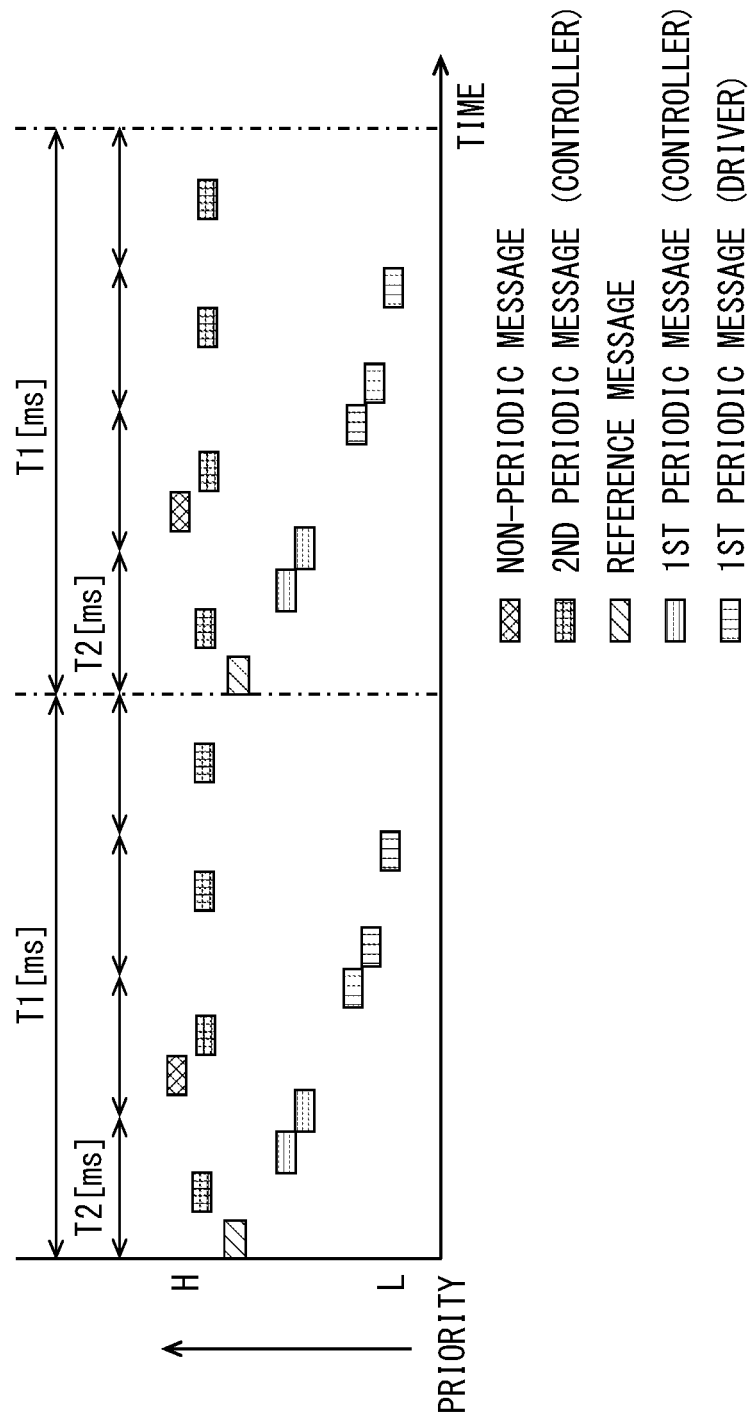
FIG. 4 is a timing chart of a relationship between various kinds of messages transmitted with lapse of time in the load drive system.
Figure 6:
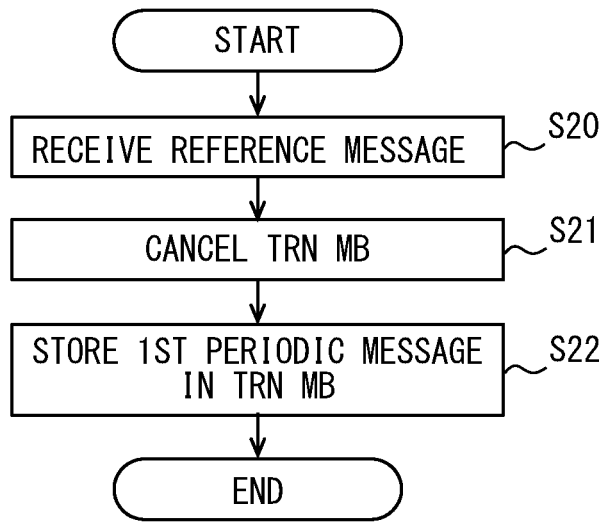
FIG. 6 is a flowchart of a transmission process of a first periodic message performed by the controller and a driver.
Figure 7:
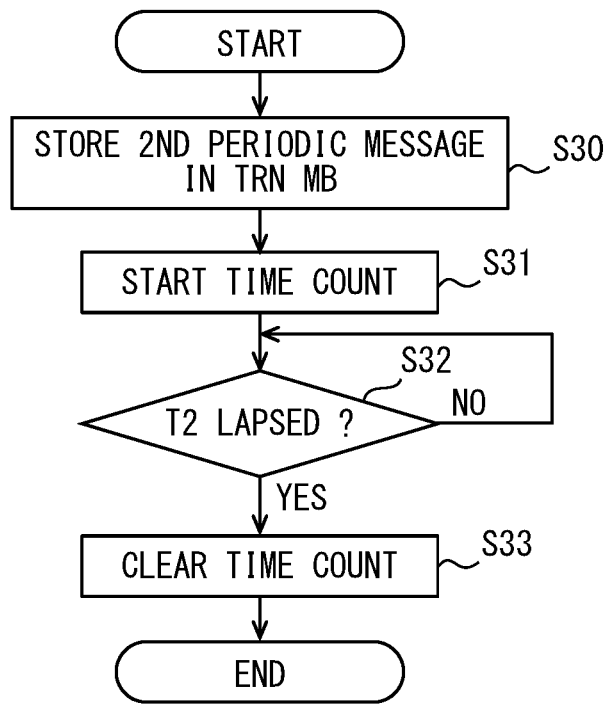
FIG. 7 is a flowchart of a second periodic message transmission process performed by the controller.
Figure 8:
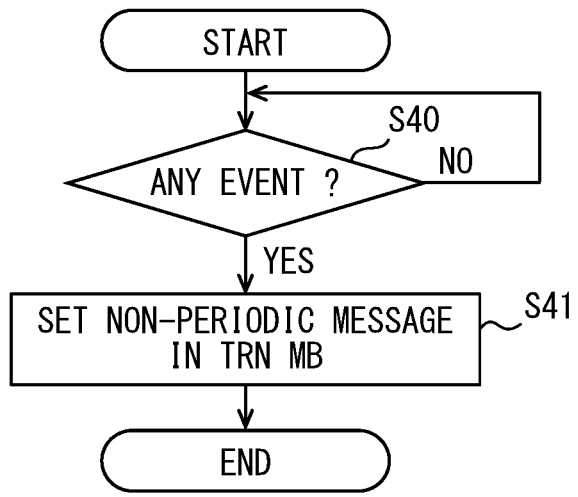
FIG. 8 is a flowchart of a process performed by the controller in response to an occurrence of a predetermined phenomenon.
Figure 9:
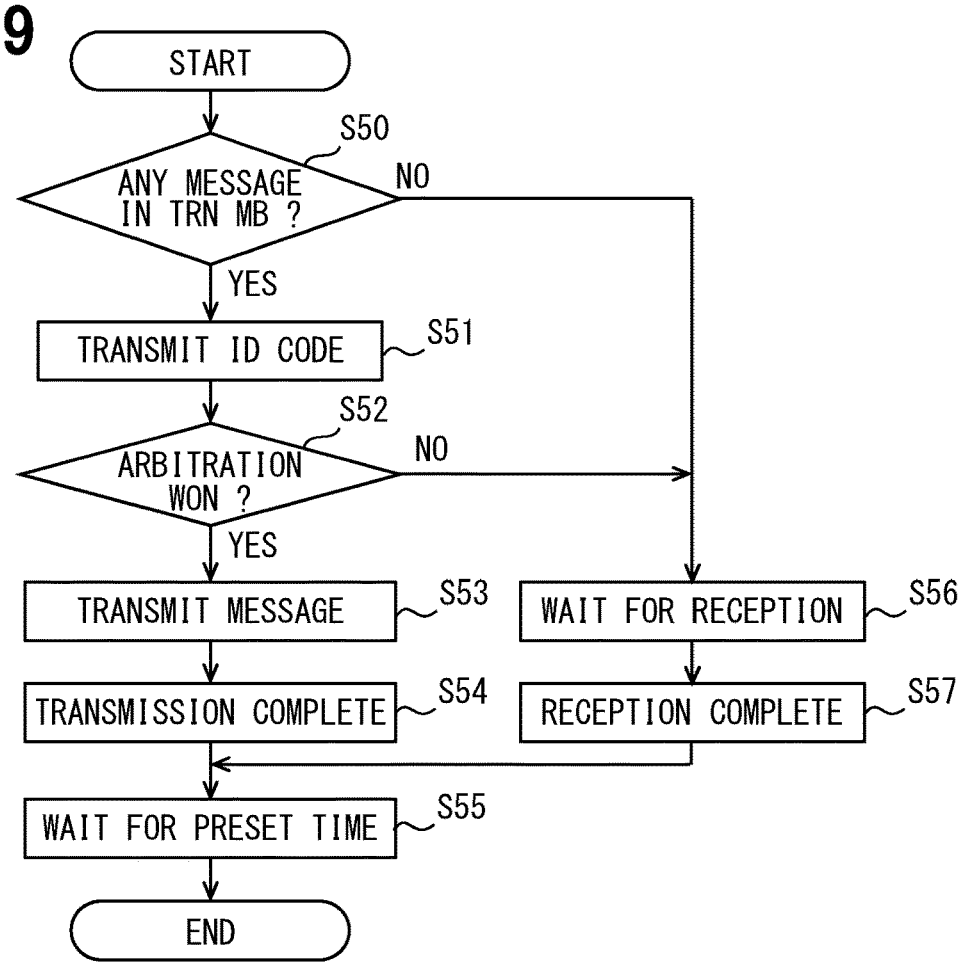
FIG. 9 is a flowchart of a message transmission/reception process performed by the controller and the driver.

Next, the operation of the load drive system 14 is described with reference to FIGS. 4 to 9. FIG. 4 is a timing chart of the relationship among various messages transmitted with the lapse of time in the load drive system 14. FIG. 5 is a flowchart of a transmission process of a reference message performed by the controller 30. FIG. 6 is a flowchart of a transmission process of the first periodic message performed by the controller 30 and the driver 40. FIG. 7 is a flowchart of a transmission process of a second periodic message performed by the controller 30. FIG. 8 is a flowchart of a process performed by the controller 30 in response to an occurrence of a predetermined phenomenon. FIG. 9 is a flowchart of a message transmission/reception process performed by the controller 30 and the driver 40. In FIGS. 5 to 9, a message box is indicated as MB. First, a transmission process of a reference message performed by the controller 30 is described with reference to FIGS. 4 and 5.

First, the CAN controller 34 of the controller 30 transmits a reference message to the communication bus 20 via the CAN transceiver 32 (Step S10). The reference message has a higher priority of the ID code than the first periodic message. The reference message triggers a transmission of the first periodic message described later.

Next, the microcontroller 31 starts counting the elapsed time from a timing when the transmission of the reference message is substantially started by a built-in timer (Step S11).

Next, the microcontroller 31 determines whether or not the elapsed time has reached T1, i.e., a certain period of time (Step S12). This time T1 corresponds to a first cycle T1 shown in FIG. 4. The first cycle T1 is, for example, 8 ms.

If it is determined in Step S12 that the elapsed time has reached the time T1, the CAN controller 34 cancels the message box 341 (Step S13). That is, the message in the message box 341 is cleared/discarded.

Next, the microcontroller 31 clears the count of the elapsed time started in Step S11 (Step S14), and ends a series of processes. The controller 30 repeatedly performs the above process during the period when the power is turned ON.

As shown in FIG. 4, the controller 30 transmits a reference message in every first cycle T1. The first cycle T1 is set to a length capable of transmitting all the messages that need to be periodically transmitted in the load drive system 14. Specifically, the length is set so that the controller 30 and the driver 40 can transmit all the first periodic messages once, and the controller 30 can transmit the second periodic message a predetermined number of times. The predetermined number of times is determined by T1/T2.

Next, the process performed by a device that has received the reference message is described with reference to FIG. 6. In the present embodiment, the controller 30 and the driver 40 perform the process shown in FIG. 6.

First, the CAN controllers 34 and 45 receive a reference message from the communication bus 20 via the corresponding CAN transceivers 32 and 44 (Step S20).

Next, the CAN controllers 34 and 45 cancel the transmission message boxes 341 and 451 in preparation for the transmission of a new periodic data message (Step S21).

Next, the CAN controllers 34 and 45 store the first periodic message to be transmitted in response to the reference message in the message boxes 341 and 451 (Step S22). The CAN controller 34 stores the message of the target current value calculated by the CPU 33 in the message box 341 as the first periodic message. The message of the target current value corresponds to a first instruction message.

The CAN controller 45 stores the message of the actual current value in the message box 451 as the first periodic message. The CAN controller 45 stores the message of the detection value acquired from the sensor detection circuit 43 in the message box 451 as the first periodic message.

These first periodic messages have a lower priority of the ID code than the reference message. In the present embodiment, the first periodic message transmitted by the controller 30 has a higher priority of the ID code than the first periodic message transmitted by the driver 40.

The controller 30 and the driver 40 perform the above processing each time a reference message is received.

Next, based on FIG. 7, a process performed by the controller 30 on a regular basis regardless of the reference message, i.e., periodically, is described.

First, the CAN controller 34 of the controller 30 stores the message of the duty ratio calculated by the CPU 33 in the message box 341 as the second periodic message (Step S30). The second periodic message corresponds to a second instruction message.

Next, the microcontroller 31 starts counting the elapsed time from the timing when the second periodic message is set in the message box 341 (Step S31).

Next, the microcontroller 31 determines whether or not the elapsed time has reached for a certain period of time T2 (Step S32). The time T2 corresponds to a second cycle T2 shown in FIG. 4. The second cycle T2 is shorter than the first cycle T1. The second cycle T2 is, for example, 2 ms. Therefore, the first cycle T1 is four folds of the second cycle T2.

When it is determined in Step S32 that T2 has reached a certain period of time, the microcontroller 31 clears the count of the elapsed time started in Step S31 (Step S33), and ends a series of processes. The controller 30 repeatedly performs the above process during the period when the power is turned ON.

As shown in FIG. 4, the controller 30 transmits a second periodic message in every second cycle T2. The second periodic message has a higher priority of the ID code than the reference message and the first periodic message. The second periodic message having a short transmission cycle can be transmitted in a prioritized manner than the first periodic message having a long transmission cycle.

Next, based on FIG. 8, a flowchart of a process performed by the controller 30 in response to an occurrence of a predetermined phenomenon is described.

First, the microcontroller 31 of the controller 30 determines whether or not an event corresponding to a predetermined phenomenon has occurred (Step S40). As described above, the microcontroller 31 determines whether or not an abnormality has occurred based on the state of the automatic transmission 10. The microcontroller 31 determines whether or not an abnormality has occurred in the automatic transmission 10 based on the first periodic message transmitted by the driver 40. The first periodic message transmitted by the driver 40 is a message indicating the state of the automatic transmission 10, and corresponds to a state message. The process of step S40 performed by the microcontroller 31 corresponds to a determination unit.

When it is determined that the event has occurred in Step S40, the CAN controller 34 stores a non-periodic message to be transmitted in response to the event in the message box 341 (Step S41), and ends a series of processes. The controller 30 repeatedly performs the above process during the period when the power is turned ON.

The non-periodic message is an emergency instruction message for performing an energization of all solenoids 13 in a predetermined abnormality treatment state. The non-periodic message corresponds to an abnormality handling message. The non-periodic message has a higher priority of the ID code than the reference message, the first periodic message, and the second periodic message. As a result, when an event occurs, the non-periodic message can be transmitted in a prioritized manner than the transmission of other messages. The non-periodic messages may also be referred to as event transmission messages.

The non-periodic message shows an example of a message in which the power supply switch 15 is turned off in order to put all the solenoids 13 into an abnormality treatment state, but the present disclosure is not limited to such operation. The non-periodic message may be a message that turns OFF all drive switches 4111 in order to put all solenoids 13 into an abnormality treatment state. The non-periodic message may be an instruction message of an energization pattern fixed to a predetermined shift/gear (for example, third speed) in order to put all the solenoids 13 into an abnormality treatment state.

Next, a message transmission/reception process performed by the controller 30 and the driver 40 is described with reference to FIG. 9.

First, the CAN controllers 34 and 45 determine whether or not there is a message stored in the corresponding transmission message boxes 341 and 451 (Step S50).

If it is determined in Step S50 that there is a message in the message box, the CAN controllers 34 and 45 then transmit the ID code associated with the stored message, that is, the priority information, to the communication bus 20 (Step S51).

Next, the CAN controllers 34 and 45 determine whether or not the transmitted ID code has won the arbitration (Step S52).

When it is determined in Step S52 that the transmitted ID has won the arbitration, the CAN controllers 34 and 45 then transmit the arbitration win message (Step S53). When the transmission of the message is complete (Step S54), the CAN controllers 34 and 45 wait for a preset time, for example, a time of 3 bits (Step S55), and end a series of processes.

On the other hand, when it is determined in Step S50 that there is no message in the message box, or when it is determined in Step S52 that the arbitration is lost, the CAN controllers 34 and 45 wait for a reception of a message (Step S56). When a reception of the message is complete (Step S57), the process of step S55 is performed, and the CAN controllers 34 and 45 end a series of processes.

The controller 30 and the driver 40 repeatedly perform the above processing during the period when the power is turned ON. The controller 30 and the driver 40 can perform transmission, reception, and arbitration control according to the CAN protocol by the process shown in FIG. 9.

Summary of the First Embodiment

In the load drive system 14 of the present embodiment, the controller 30 transmits two types of instruction messages indicating the drive state of the solenoid 13 to the communication bus 20 in different transmission cycles.

The controller 30 transmits a first periodic message instructing the target current value in the first cycle T1 (8 ms). The driver 40 drives the solenoid 13 according to the target current value of the received first periodic message. The driver 40 sets the duty ratio so that the actual current value follows the target current value, and outputs a PWM signal.

The controller 30 transmits a second periodic message instructing the duty ratio in the second cycle T2 (2 ms). The driver 40 drives the solenoid 13 according to the duty ratio of the received second periodic message. The controller 30 instructs the duty ratio in a cycle shorter than the first cycle T1. The controller 30 including the microcontroller 31 finely changes (i.e., modifies in a fine-tuned manner) the drive setting of the solenoid 13 according to the state of the automatic transmission 10. As a result, even if current fluctuations such as overshoot and current ripple may have been caused due to driving based on the target current value, the current fluctuation can immediately be suppressed.

In a configuration in which messages are transmitted all times at regular intervals, i.e., periodically, all instruction messages must be transmitted in the short(est) transmission cycle in order to reflect all instruction contents. In such a case, the amount of communication increases. In addition, since the number of messages having a short transmission cycle increases, noise also increases. On the other hand, the controller 30 of the present embodiment does not transmit all the instruction messages according to the short transmission cycle, but transmits each of the instruction messages at a timing required for control. Therefore, the amount of communication between the controller 30 and the driver 40 is reducible In particular, the load drive system 14 of the present embodiment controls the drive of a plurality of solenoids 13 in the automatic transmission 10. Since the driving of a plurality of loads is controlled, the amount of communication between the controller 30 and the driving device 40 is large. However, since each of the instruction messages is transmitted at a timing required for control, the amount of communication is reduced.

The communication method of the present disclosure is not particularly limited as long as the controller 30 can transmit two types of instruction messages having different transmission cycles to the driver 40 via the communication bus 20. For example, a time trigger method such as TTCAN or FlexRay (registered trademark) can be adopted. Further, Ethernet (registered trademark) may also be adopted. In the present embodiment, the controller 30 and the driver 40 can transmit and receive messages via the communication bus 20 of an in-vehicle network conforming to the CAN protocol.

In the present embodiment, the PWM output circuit 413 of the drive circuit 41 generates PWM signals for a plurality of solenoid drive circuits 411 (i.e., for the drive switch 4111) according to one, i.e., single, instruction message transmitted from the controller 30. The PWM output circuit 413 converts data of the single instruction message (i.e., frame) into a plurality of drive instructions without using a microcontroller. Since a plurality of solenoids 13 can be driven by the single instruction message, the amount of communication reducible. Note that one message transmitted by the controller 30 may include a drive instruction for all of the solenoids 13. The drive instructions for all of the solenoids 13 may be divided (i.e., grouped) into the smaller number of messages than the number of solenoids 13.

In the present embodiment, the microcontroller 31 of the controller 30 determines whether or not an abnormality has occurred in the automatic transmission 10 based on the state of the automatic transmission 10 acquired from the driver 40. When it is determined that an abnormality has occurred, the CAN controller 34 of the controller 30 transmits a non-periodic message instructing the processing corresponding to the abnormality to the driver 40 via the communication bus 20. The non-periodic message corresponds to an abnormality handling message.

The non-periodic message has a higher priority of the ID code than the instruction message, the first periodic message and the second periodic message. As a result, the non-periodic message is not transmitted in the transmission cycle of the periodic message (that is, at predetermined, fixed timings), but is transmitted at the timing of the occurrence of an abnormality (i.e., an event).

In particular, in the present embodiment, as a non-periodic message, an emergency instruction message is transmitted for performing an energization of all solenoids 13 in a predetermined abnormality treatment state. The driver 40 performs an abnormality handling such as turning OFF the power supply switch 15 according to the received non-periodic message. The driver 40 does not perform the calculation of the microcontroller (CPU). That is, without spending time required for the calculation, or, arithmetic processing, the driver 40 can quickly perform the abnormality treatment.

The controller 30 and a device that transmits a message about the state of the automatic transmission 10 to the controller 30 may be connected by a direct communication line. For example, the controller 30 and the sensor 16 may be directly connected by a direct communication line. The controller 30 and the driver 40 may be directly connected by a direct communication line. In such a configuration, a signal indicating the state of the automatic transmission 10 is transmitted to the controller 30 through the direct communication line.

In the present embodiment, the CAN controller 45 of the driver 40 transmits a first periodic message indicating the state of the automatic transmission 10 to the controller 30 via the communication bus 20 (CAN bus). As a result, noise resistant characteristics can be improved and communication reliability can be heightened as compared with a configuration using a direct communication line. Further, since bi-directional communication is possible, it is possible to eliminate the direct communication line for acquiring the state of the automatic transmission 10. Therefore, the number of communication lines (wiring) is reducible.

The arrangement of the controller 30 and the driver 40 constituting the load drive system 14 is not particularly limited. In the present embodiment, the driver 40 is arranged on the valve body 11 constituting the automatic transmission 10. That is, the driver 40 and the automatic transmission 10 form a mechatronic integrated device. On the other hand, the controller 30 is mechanically separated from the automatic transmission 10. In such manner, the controller 30 including the microcontroller 31 is kept away from the heat and vibration of the automatic transmission 10 (load). As a result, it is possible to reduce the cost of heat countermeasures and vibration countermeasures for the controller 30. Further, the driver 40 does not include a microcontroller, and does not cause various malfunctions due to calculation. Therefore, the driver 40 can eliminate the need for an arithmetic monitoring circuit. As a result, it is possible to reduce the cost required for countermeasures against heat and vibration.

Second Embodiment

The second embodiment is a modification of a preceding embodiment that serves as a basic configuration, and may incorporate description of the precedent embodiment. In the preceding embodiment, the messages are sequentially stored in the message box. Instead, message boxes may be provided separately according to the ID code.

Figure 10:
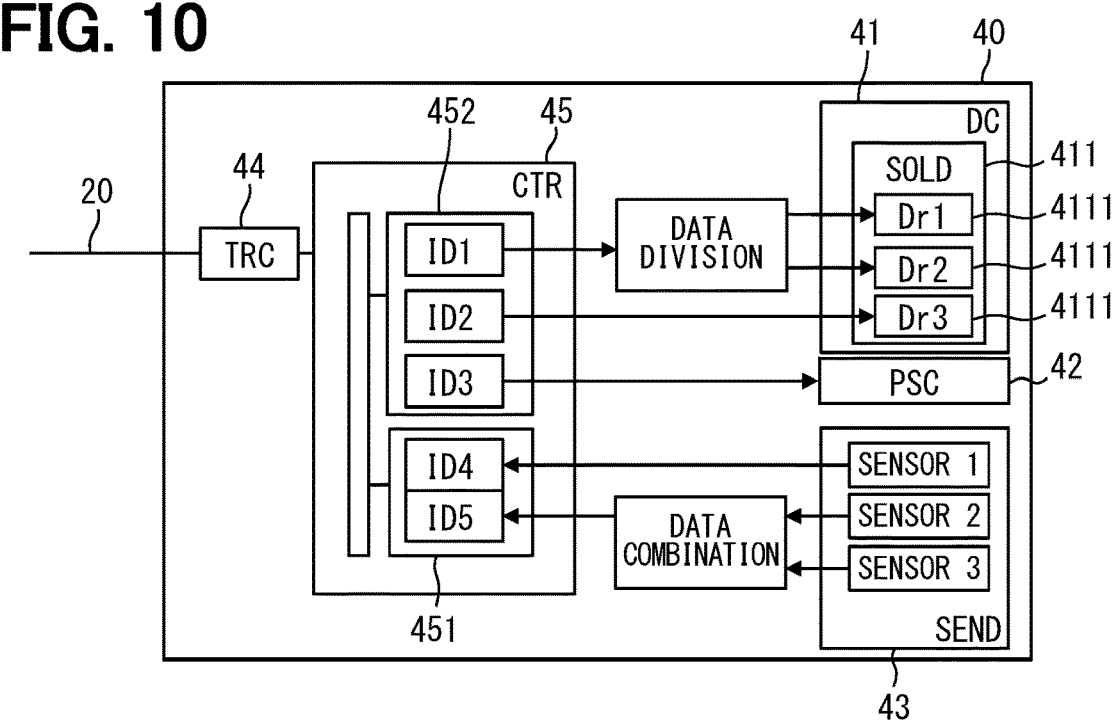
FIG. 10 is a diagram of a configuration of the driver in the load drive system according to a second embodiment.

FIG. 10 shows a schematic configuration of the driver 40 in the load drive system 14 of the present embodiment. In FIG. 10, some elements of the drive circuit 41 are omitted. Although not shown, in the present embodiment, the automatic transmission 10 has the three solenoids 13. Therefore, as shown in FIG. 10, the solenoid drive circuit 411 has the three drive switches 4111. In FIG. 10, each of the drive switches 4111 is designated as Dr1, Dr2, and Dr3, respectively. Further, in the sensor detection circuit 43, the detection unit of each sensor 16 is indicated as a sensor 1, a sensor 2, and a sensor 3.

As shown in FIG. 10, the CAN controller 45 of the driver 40 has message boxes 451 and 452 according to the ID code (i.e., the priority information). The transmission message box 451 is divided for each ID code. Therefore, information to be transmitted is determined for each message box 451. The CAN controller 45 stores, for example, data transmitted from the sensor detection circuit 43 in the message box 451 having an ID corresponding to the transmitted data.

In an example of FIG. 10, the CAN controller 45 stores the output of the sensor 1 in the message box 451 having an ID 4. Data is combined regarding the outputs of the sensor 2 and the sensor 3. The CAN controller 45 stores the combined data in the message box 451 having an ID 5. The CAN controller 45 performs the transmission process according to the priority order of ID 4 and ID 5. In such manner, the data of the sensors 2 and 3 is transmitted to the controller 30 as a single message (i.e., frame).

The reception message box 452 is divided for each of the ID codes. Therefore, information to be received is determined for each message box 452. The CAN controller 45 stores, for example, data transmitted from the sensor detection circuit 43 in the message box 451 having an ID corresponding to the transmitted data.

In an example of FIG. 10, the message box 452 having an ID 1 stores data instructing the drive of Dr1 and Dr2 of the drive switches 4111 of the solenoid drive circuit 411. The CAN controller 45 outputs the data stored in the message box 451 having the ID 1 to Dr1 and Dr2. The data of ID 1 is input to the PWM output circuit 413 (not shown) after the data is divided. In such manner, the PWM output circuit 413 generates PWM signals corresponding to each of Dr1 and Dr2, and outputs them to the gates of Dr1 and Dr2. In such manner, the data of a single message (i.e., frame) is converted into plural drive instructions for a plurality of switches 4111, i.e., Dr1 and Dr2, without using a microcontroller.

The message box 452 having an ID 2 stores data instructing the drive of Dr3 among the drive switches 4111 of the solenoid drive circuit 411. The CAN controller 45 outputs the data stored in the message box 451 having the ID 2 to Dr3. The PWM output circuit 413 generates a PWM signal corresponding to Dr3 based on the data having the ID 2, and outputs the PWM signal to the gate of Dr3.

A non-periodic message is stored in the message box 452 having an ID 3. When the data of the non-periodic message is, for example, data instructing the power supply switch 15 to be turned OFF, the CAN controller 45 outputs the emergency instruction data stored in the message box 451 having the ID 3 to the breaker circuit 42. In such manner, the breaker circuit 42 turns OFF the power supply switch 15. The configuration other than the above is the same as the configuration described in the preceding embodiment.

Summary of the Second Embodiment

According to the present embodiment, the CAN controller 45 of the driver 40 includes the message boxes 451 and 452 according to the ID code, and performs input/output processing according to the message boxes 451 and 452. In such manner, an erroneous overwriting of message (data) is preventable. Further, in the driver 40, a plurality of processes having different ID codes are performable in parallel.

Further, by adopting the message boxes 451 and 452 that are separately assigned to different control groups, it is possible to suppress one control erroneously affecting the other, in case of malfunction of the like, for example. For example, a control group may be set for respective solenoids 13. A control group is set according to a process performed by the microcontroller 31.

The controller 30 may also have the message boxes 341, 342 of the CAN controller 34 divided according to the ID code.

The division and combination of data are not particularly limited to the above examples. The number of message boxes 451 and 452 is not particularly limited to the above example. The number of message boxes may be set to correspond to the number of ID codes.

Other Embodiments

The present disclosure in the specification and drawings is not limited to the above-exemplified embodiments. The present disclosure encompasses the illustrated embodiments and modifications of the embodiments by those skilled in the art. For example, the present disclosure is not limited to the combination of the components and/or elements shown in the embodiments. The present disclosure may be implemented in various combinations. The present disclosure may have additional portions that may be addable to the embodiments. The present disclosure encompasses the embodiments with some of the components and/or elements omitted therefrom. The present disclosure encompasses the replacement or combination of components and/or elements between one embodiment and another. The disclosed technical scope is not limited to the description of the embodiments. Some technical scopes disclosed in the specification are indicated by the recitation of the claims, and should be understood to include all modifications within the meaning and scope equivalent to the scope of the recited claims.

The disclosure in the specification, drawings and the like is not limited by the description of the claims. The disclosure in the specification, drawings and the like encompass the technical ideas described in the claims, and is further extendable to a wider variety of technical ideas than those in the claims. Therefore, various technical ideas can be extracted from the disclosure of the specification, the drawings and the like without being limited to the description of the claims.

The driver 40 has, in the above, a configuration in which the breaker circuit 42 is provided separately from the drive circuit 41, but the present disclosure is not limited to such configuration. The breaker circuit 42 may be configured as a part of the drive circuit 41.

For example, the breaker circuit 42 and the power supply switch 15 may be omissible.

The number of solenoids 13 that are loads is not particularly limited. The load is not limited to the automatic transmission 10 (i.e., solenoid 13). The load is not limited to the one mounted on the vehicle. The load drive system 14 described above is suitable for controlling the drive state of each of a plurality of actuators.

What is claimed is:

1. A load drive system comprising:
a communication bus;
a controller having a controller side communication unit that transmits an instruction message instructing a drive state of a load via the communication bus, the controller side communication unit transmitting, as the instruction message, a first message in a first cycle and a second message in a second cycle that is different from the first cycle; and
a driver having (i) a driver side communication unit that receives the instruction message via the communication bus, and (ii) a drive circuit that drives the load according to the received instruction message, wherein
the controller has a determination unit for determining whether or not an abnormality has occurred in the load based on a state of the load acquired from an outside,
the controller side communication unit transmits the instruction message according to a priority associated in advance, and
when the determination unit determines that an abnormality has occurred, the controller side communication unit transmits an abnormality handling message having a higher priority than the instruction message to the driver via the communication bus.

2. The load drive system of claim 1, wherein
the driver has a plurality of drive units respectively for driving a plurality of the loads, and
the plurality of drive units operate according to instructions of a single instruction message transmitted from the controller.

3. The load drive system of claim 1, wherein
when the driver side communication unit receives the abnormality handling message, the driver performs an energization of the load in an abnormality treatment state according to the abnormality handling message.

4. The load drive system of claim 2, wherein
the driver side communication unit transmits a state message indicating a state of the load to the controller via the communication bus, and
the controller side communication unit receives the state message via the communication bus.

5. The load drive system of claim 2, wherein
the driver side communication unit has message boxes divided according to priorities associated in advance.

6. The load drive system of claim 2, wherein
the driver forms a mechatronic integrated device together with the load, and
the controller is separate from the mechatronics integrated device.

7. A load drive system comprising:
a communication bus;
a controller having a controller side communication unit that transmits an instruction message instructing a drive state of a load via the communication bus, the controller side communication unit transmitting, as the instruction message, a first message in a first cycle and a second message in a second cycle that is different from the first cycle;
a driver having (i) a driver side communication unit that receives the instruction message via the communication bus, and (ii) a drive circuit that drives the load according to the received instruction message;
a first Controller Area Network (CAN) controller including a processor located in the controller;
a first non-transitory computer-readable storage medium located in the controller;
a second CAN controller located in the driver; and
a second non-transitory computer-readable storage medium located in the driver, wherein
the controller has a determination unit for determining whether or not an abnormality has occurred in the load based on a state of the load acquired from an outside,
the controller side communication unit transmits the instruction message according to a priority associated in advance, and
when the determination unit determines that an abnormality has occurred, the controller side communication unit transmits an abnormality handling message having a higher priority than the instruction message to the driver via the communication bus.

8. The load drive system of claim 7, wherein
the driver has a plurality of drive units respectively for driving a plurality of the loads, and
the plurality of drive units operate according to instructions of a single instruction message transmitted from the controller.

9. The load drive system of claim 7, wherein
when the driver side communication unit receives the abnormality handling message, the driver performs an energization of the load in an abnormality treatment state according to the abnormality handling message.

10. The load drive system of claim 7, wherein
the driver side communication unit transmits a state message indicating a state of the load to the controller via the communication bus, and
the controller side communication unit receives the state message via the communication bus.

11. The load drive system of claim 7, wherein
the driver side communication unit has message boxes divided according to priorities associated in advance.

12. The load drive system of claim 7, wherein
the driver forms a mechatronic integrated device together with the load, and
the controller is separate from the mechatronics integrated device.

* * * * *